(12) United States Patent
Yoneno (10) Patent No.: US 8,591,035 B2
(45) Date of Patent: Nov. 26, 2013

(54) DISPLAY DEVICE

(75) Inventor: Kunio Yoneno, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 149 days.

(21) Appl. No.: 13/404,557

(22) Filed: Feb. 24, 2012

(65) Prior Publication Data
US 2012/0236269 A1     Sep. 20, 2012

(30) Foreign Application Priority Data

Mar. 14, 2011  (JP) ................................. 2011-055184

(51) Int. Cl.
    *G03B 21/14*     (2006.01)
(52) U.S. Cl.
    USPC ................ 353/10; 359/479; 359/529; 353/99
(58) Field of Classification Search
    USPC ............ 353/7, 10, 79, 28; 359/458, 459, 478, 359/479, 630, 631, 636, 529
    See application file for complete search history.

(56) References Cited

U.S. PATENT DOCUMENTS

| | | | | |
|---|---|---|---|---|
| 4,526,439 A | * | 7/1985 | Okoshi et al. | 359/458 |
| 5,583,695 A | * | 12/1996 | Dobrusskin | 359/633 |
| 5,861,993 A | * | 1/1999 | Shanks et al. | 359/629 |
| 6,204,973 B1 | * | 3/2001 | Holden | 359/629 |
| 6,467,913 B1 | * | 10/2002 | Holden et al. | 359/530 |
| 7,965,448 B2 | * | 6/2011 | Maekawa | 359/629 |
| 8,057,043 B2 | * | 11/2011 | Maekawa | 353/10 |
| 8,123,370 B2 | * | 2/2012 | Maekawa | 359/857 |
| 8,434,872 B2 | * | 5/2013 | Maekawa | 353/10 |
| 8,498,062 B2 | * | 7/2013 | Maekawa | 359/726 |
| 2004/0263946 A9 | | 12/2004 | Liang et al. | |
| 2009/0310231 A1 | | 12/2009 | Maekawa | |
| 2010/0177402 A1 | | 7/2010 | Maekawa | |
| 2010/0231860 A1 | | 9/2010 | Maekawa | |
| 2011/0285965 A1 | * | 11/2011 | Sugiyama | 353/10 |

FOREIGN PATENT DOCUMENTS

| | | |
|---|---|---|
| JP | A-2004-104566 | 4/2004 |
| JP | A-2005-10755 | 1/2005 |
| JP | A-2008-158114 | 7/2008 |
| JP | A-2009-25776 | 2/2009 |
| JP | A-2009-229905 | 10/2009 |
| WO | WO2007/116639 A1 | 10/2007 |

* cited by examiner

*Primary Examiner* — William C Dowling
(74) *Attorney, Agent, or Firm* — Oliff & Berridge, PLC (57) ABSTRACT

A display device includes a projector, a Fresnel lens converting a projected light from the projector into a nearly parallelized light, a screen with light reflectivity on which an image by the projected light from the projector is generated, and a retrotransmissive material forming another image of an image located on one side of an element plane in a position in a space on the other side of the element plane such that the image and the other image are symmetric with respect to the element plane. The retrotransmissive material forms an image by a light that has obliquely entered the element plane, such that a position from which the light has obliquely entered the element plane and a position in which the image is formed are symmetric with respect to the element plane, and thereby forms a real image of the image on the screen.

9 Claims, 11 Drawing Sheets

DISPLAY DEVICE

BACKGROUND

1. Technical Field

The present invention relates to display devices.

2. Related Art

A display device that includes an imaging element forming an image of an object to be projected and can generate a stereoscopic image in the air as a real image by this imaging element is disclosed in WO 07/116,639 (Patent Document 1) and JP-A-2009-229905 (Patent Document 2).

The imaging element used in the display device described in Patent Document 1 includes a plurality of unit optical elements each being formed of a dihedral corner reflector having two orthogonal mirror surfaces. This imaging element has the function of forming a real image of an object to be projected which is placed in one space of an element plane as a mirror image in a position in the other space of the element plane such that the real image and the mirror image are symmetric with respect to the element plane. As a result, when a three-dimensional object is placed in one space of the element plane, a stereoscopic image is generated in a position in the other space of the element plane such that the three-dimensional object and the stereoscopic image are symmetric with respect to the element plane.

The display device described in Patent Document 2 is configured so that the imaging element having a dihedral corner reflector similar to that of Patent Document 1 is moved above a display by a driving unit in the direction vertical to an element plane. In this display device, by changing images which are displayed on the display in synchronization with the vertical movement of the imaging element, stereoscopic midair images are generated in a space above the imaging element.

In the display device of Patent Document 1, to generate a stationary stereoscopic image, it is necessary simply to put a stationary three-dimensional object below the imaging element. However, to obtain an image of an electronically-generated dynamic three-dimensional object, a complicated structure for creating an electronically dynamic three-dimensional object by rotating a light-emitting diode (LED) array, for example, is required.

Moreover, in the display device of Patent Document 2, to allow human eyes to observe a stereoscopic image, it is necessary to move the imaging element at a frequency (for example, at a frequency of about 50 Hz or higher) at which no flicker occurs. This makes it impossible to increase the imaging element excessively, limits the size of the imaging element, and eventually limits the size of stereoscopic midair images.

Furthermore, a large-scale drive unit is required to move the imaging element at high speed in the direction vertical to the element plane.

SUMMARY

An advantage of some aspects of the invention is to provide a display device that can generate a spatial image with a simple configuration.

An aspect of the invention is directed to a display device including: a projection device that makes a projected light exit therefrom; a parallelizing element that converts the projected light from the projection device into a nearly parallelized light; an image projected plane which the projected light exiting from the projection device enters via the parallelizing element, the image projected plane having light reflectivity on which an image by the projected light is formed; and an imaging element provided between the parallelizing element and the image projected plane, the imaging element forming another image of an image located on one side of the element plane in a position in a space on the other side of the element plane such that the image and the other image are symmetric with respect to the element plane, wherein the imaging element makes a light which has entered the element plane almost perpendicularly from the parallelizing element travel in a straight line and forms an image by a light that has obliquely entered the element plane among diffuse lights from the image projected plane, such that a position from which the light has obliquely entered the element plane and a position in which the image is formed are symmetric with respect to the element plane, and thereby forms a real image of the image on the image projected plane.

With the display device according to the aspect of the invention, the projected light exiting from the projection device enters the imaging element in a state in which the projected light is nearly parallelized by the parallelizing element. Since the imaging element has the function of making the light that has almost perpendicularly entered the element plane travel in a straight line, the projected light that has passed through the parallelizing element passes through the imaging element without change and is then projected onto the image projected plane, whereby an image is formed. At this time, since the image projected plane has light reflectivity, the projected light is reflected off the image projected plane and at the same time is diffused thereby, and enters the imaging element again in a state in which the angle distribution is widened. Since the imaging element has the function of forming an image by the light that has obliquely entered the element plane such that a position from which the light has obliquely entered the element plane and a position in which the image is formed are symmetric with respect to the element plane, a real image is generated in a space which is opposite to the side on which the image projected plane is placed with the imaging element sandwiched between them such that the real image and the image on the image projected plane are symmetric with respect to a plane. In this way, it is possible to realize a display device that can generate an image in space with a simple configuration without the need for a driving unit or the like.

In the display device according to the aspect of the invention, the image projected plane may be a flat surface.

With this configuration, by using a common screen or the like as the image projected plane, it is possible to form a planar image in space.

In the display device according to the aspect of the invention, it is preferable that, when the image projected plane is a flat surface, the image projected plane be placed so as to be inclined relative to the element plane of the imaging element.

Since an image by the light that has obliquely entered the element plane of the imaging element is formed such that a position from which the light has obliquely entered the element plane and a position in which the image is formed are symmetric with respect to the element plane, when the image projected plane is placed so as to be inclined relative to the element plane of the imaging element, a real-image forming face is also inclined, in a space which is opposite to the side on which the image projected plane is placed, such that the real-image forming face and the image projected plane are symmetric with respect to the element plane of the imaging element. Therefore, when the user looks at the real image obliquely from the direction in which the real-image forming face is inclined, the real image faces the user almost directly, whereby the user can easily view the image.

In the display device according to the aspect of the invention, the image projected plane may have, in at least part thereof, a convex portion protruding toward the element plane of the imaging element or a concave portion which is recessed as viewed from the element plane of the imaging element.

Since an image by the light that has obliquely entered the element plane of the imaging element is formed such that a position from which the light has obliquely entered the element plane and a position in which the image is formed are symmetric with respect to the element plane, when the image projected plane has a convex portion, a real-image forming face also has a convex portion protruding toward the element plane; when the image projected plane has a concave portion, the real-image forming face also has a concave portion which is recessed as viewed from the element plane. Therefore, since a real image is formed on the real-image forming face having a convex portion or a concave portion, it is possible to form a pseudo stereoscopic image.

In the display device according to the aspect of the invention, the convex portion or the concave portion may have a plurality of flat surfaces which are inclined relative to the element plane of the imaging element.

With this configuration, for example, it is possible to display a plurality of different images in accordance with the number of flat surfaces of the convex portion or the concave portion.

In the display device according to the aspect of the invention, the convex portion or the concave portion may be curved at least in an azimuth direction.

With this configuration, for example, it is possible to display a plurality of different images in accordance with the curved surface of the convex portion or the concave portion.

In the display device according to the aspect of the invention, when the image projected plane has the convex portion or the concave portion, a plurality of images obtained when an object to be displayed is viewed from different directions may be projected from the projection device in such a way that the images are arranged in an azimuth direction in the convex portion or the concave portion of the image projected plane.

With this configuration, since the plurality of images are displayed in a space opposite to the side on which the image projected plane is placed in such a way that the plurality of images are arranged in an azimuth direction, the user can view images which are different depending on the position in which the user views the image. Therefore, it is possible to obtain a pseudo stereoscopic image modified by kinematic parallax.

In the display device according to the aspect of the invention, it is preferable that the imaging element be formed of a retrotransmissive material having a plurality of rectangular transmission sections that allow a light to pass therethrough, and that, in the retrotransmissive material, among four wall surfaces of each transmission section, at least two wall surfaces which are orthogonal to each other be reflection planes.

In the "retrotransmissive material" of the aspect of the invention, among four wall surfaces of the transmission section, at least two wall surfaces which are orthogonal to each other are reflection planes, and the "retrotransmissive material" of the aspect of the invention is a so-called dihedral corner reflector. That is, when viewed from the direction vertical to the element plane, as in a common retroreflector, the light that has entered the reflection plane is reflected therefrom in the same direction as the direction in which the light has entered the reflection plane. On the other hand, when viewed from a direction which is parallel to the element plane and is vertical to the light incidence plane, as in a common reflecting mirror, the light that has entered the reflection plane is reflected therefrom at an angle of reflection which is the same as the angle of incidence. By using the retrotransmissive material of this type in the imaging element, it is possible to realize a display device with a simple configuration.

In the display device according to the aspect of the invention, it is preferable that, when the plurality of images are projected from the projection device, the arrangement of the wall surfaces among the four wall surfaces of the transmission section of the imaging element which wall surfaces among the four wall surfaces are reflection planes differ from region to region of the imaging element, and, in the imaging element, the reflection planes be disposed in such a way that each of the plurality of images projected on the image projected plane is reflected in an azimuth direction corresponding to a direction in which an object to be displayed is viewed.

With this configuration, when the user views an image from a predetermined azimuth direction, the user views only an image which is viewed from that direction and does not view an image from a different direction through the real-image forming face. As a result, a stereoscopic image by kinetic parallax looks more natural.

BRIEF DESCRIPTION OF THE DRAWINGS

The invention will be described with reference to the accompanying drawings, wherein like numbers reference like elements.

FIGS. 3A and 3B are diagrams showing a Fresnel lens used in the display device of this embodiment, FIG. 1A being a plan view and FIG. 1B being a sectional view.

DESCRIPTION OF EXEMPLARY EMBODIMENTS

First Embodiment

Hereinafter, a first embodiment of the invention will be described by using FIGS. 1 to 6.

A display device of this embodiment is an example of a display device that can generate a planar image in space.

Figure 1:
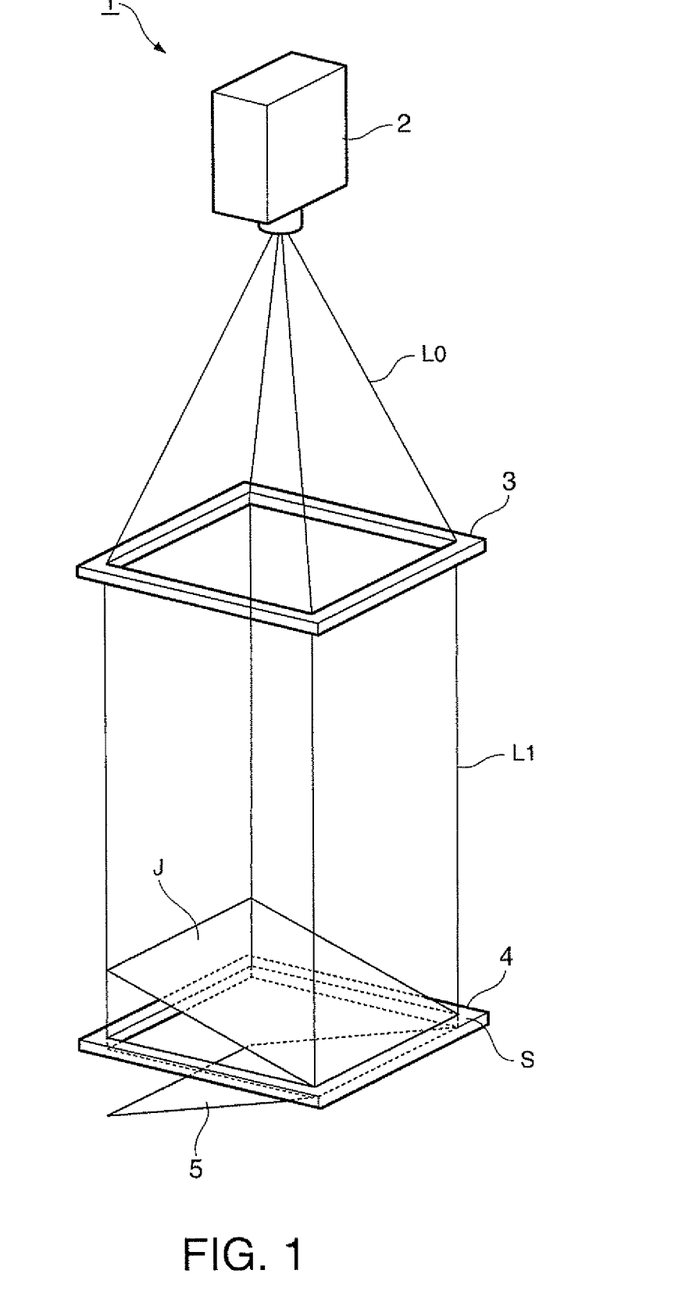
FIG. 1 is a perspective view showing a display device of a first embodiment of the invention.
Figure 2:
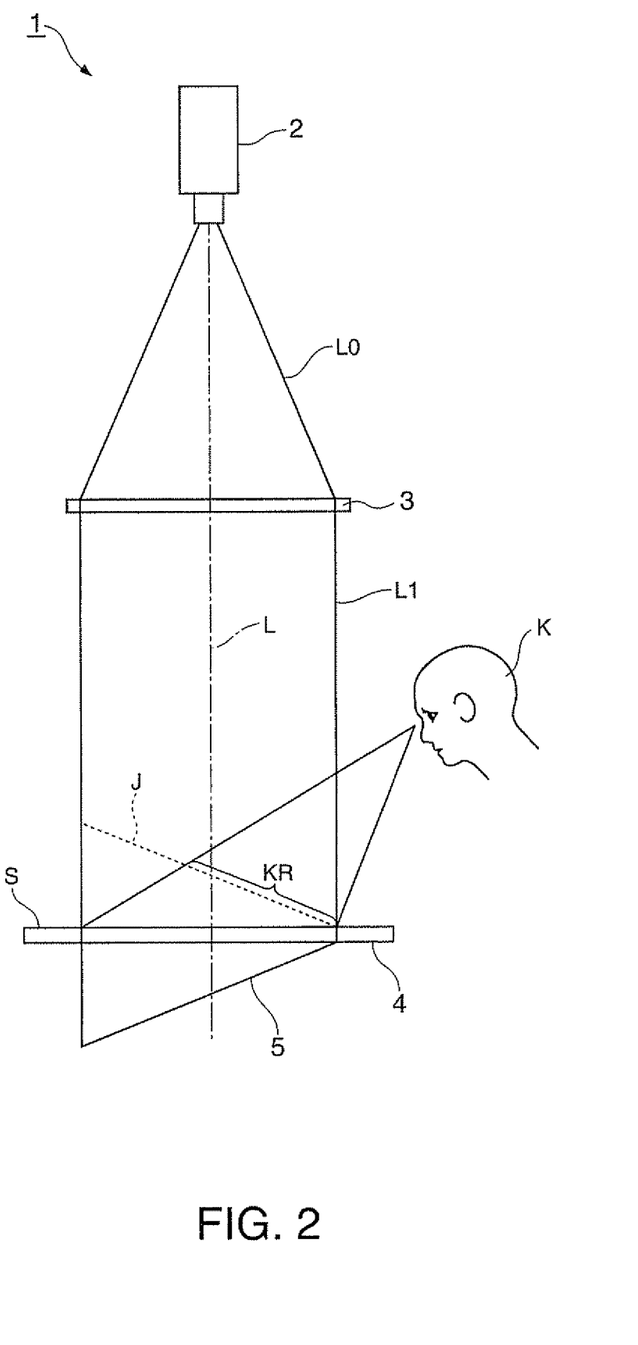
FIG. 2 is a side view showing the display device of this embodiment.
Figure 3A:
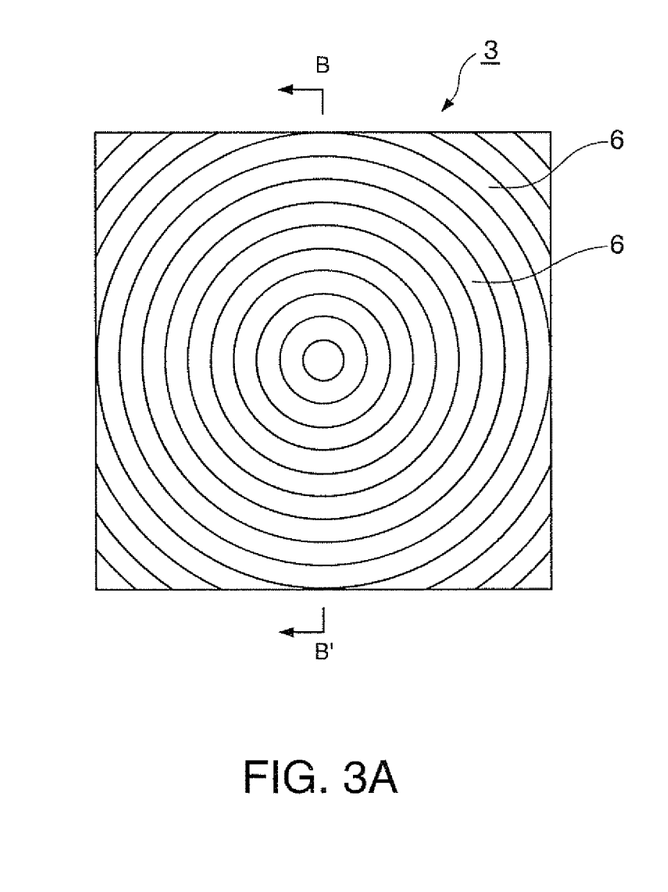
Figure 3B:
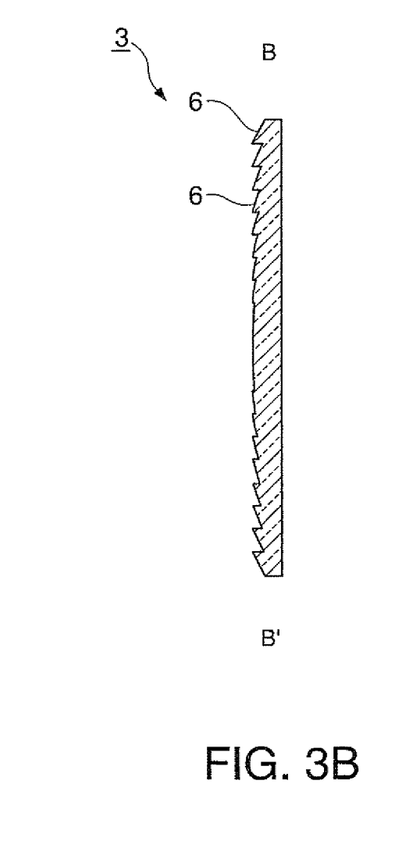
Figure 4A:
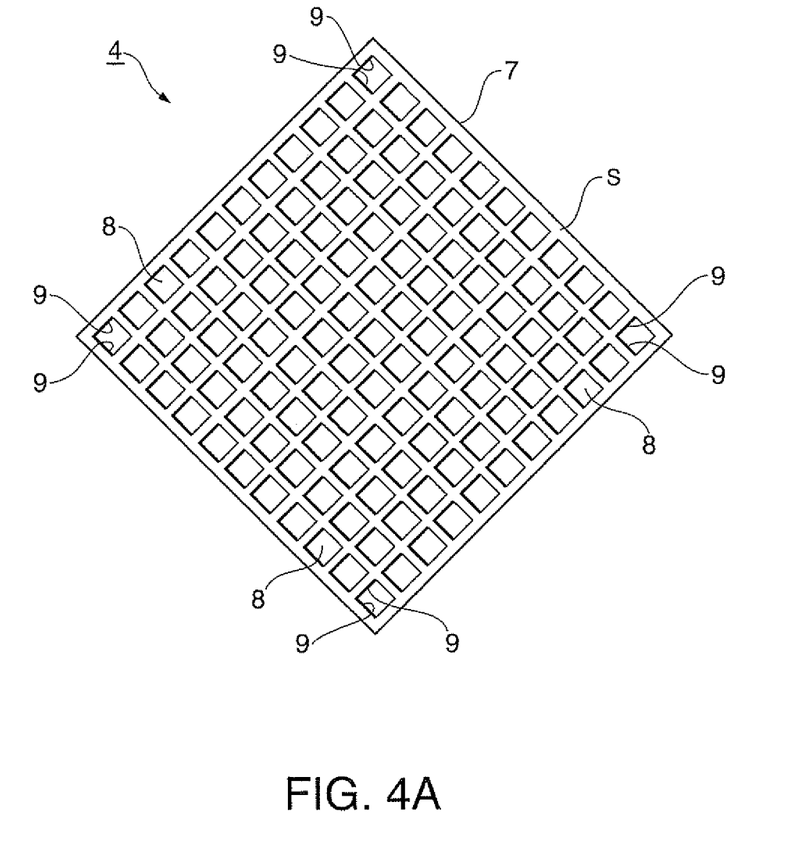
FIGS. 4A and 4B are diagrams showing a retrotransmissive material used in the display device of this embodiment, FIG. 4A being a plan view and FIG. 4B being an enlarged perspective view.
Figure 4B:
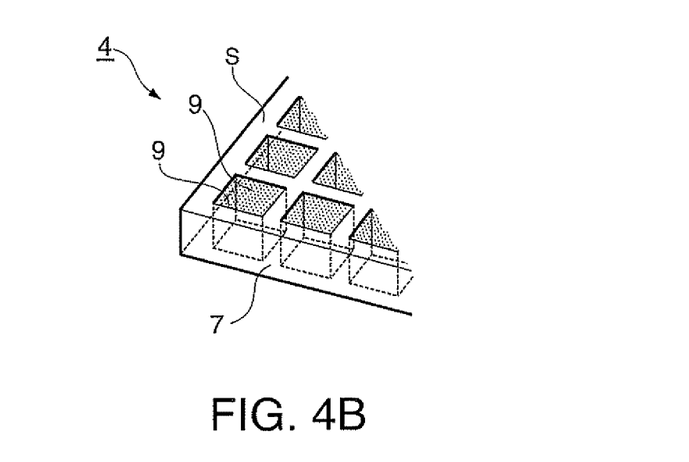
Figure 5A:
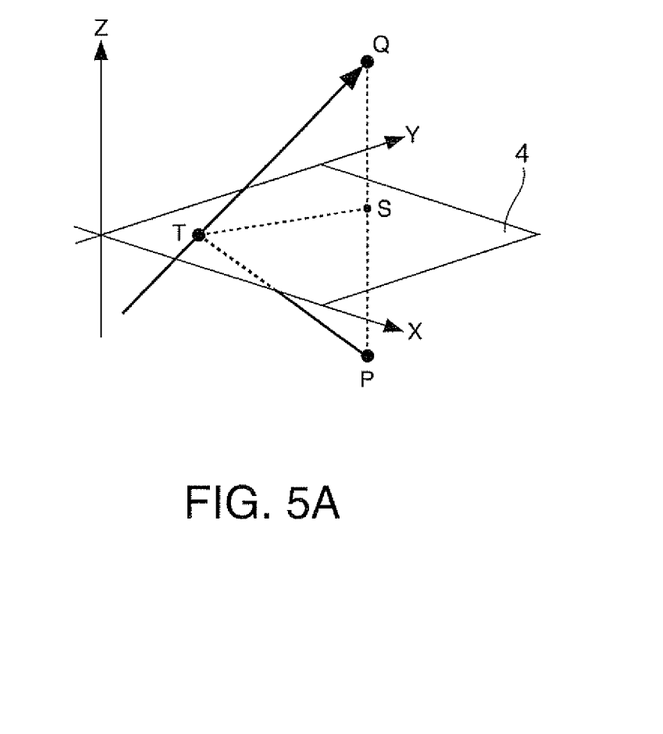
FIGS. 5A to 5C are diagrams for explaining the action of the retrotransmissive material.
Figure 5B:
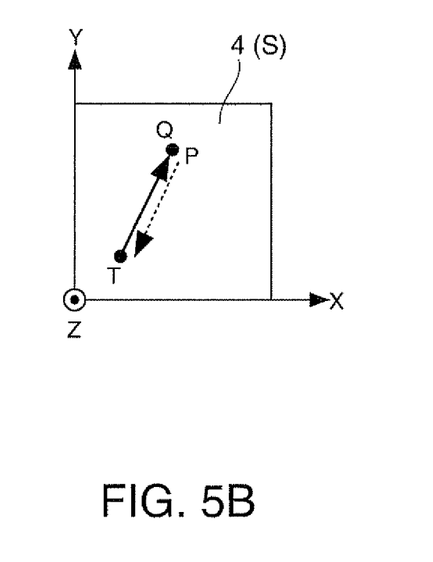
Figure 5C:
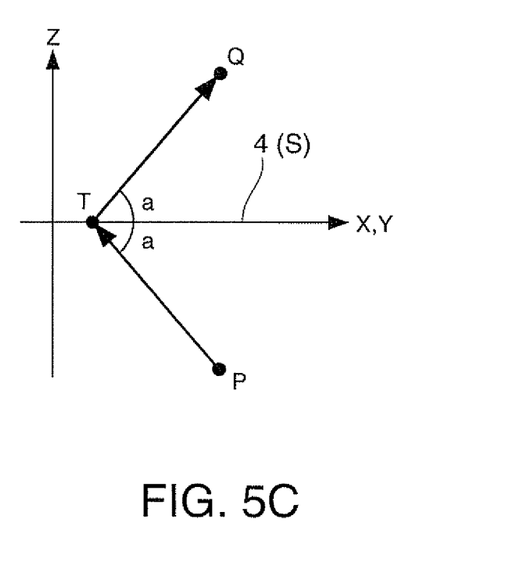
Figure 6:
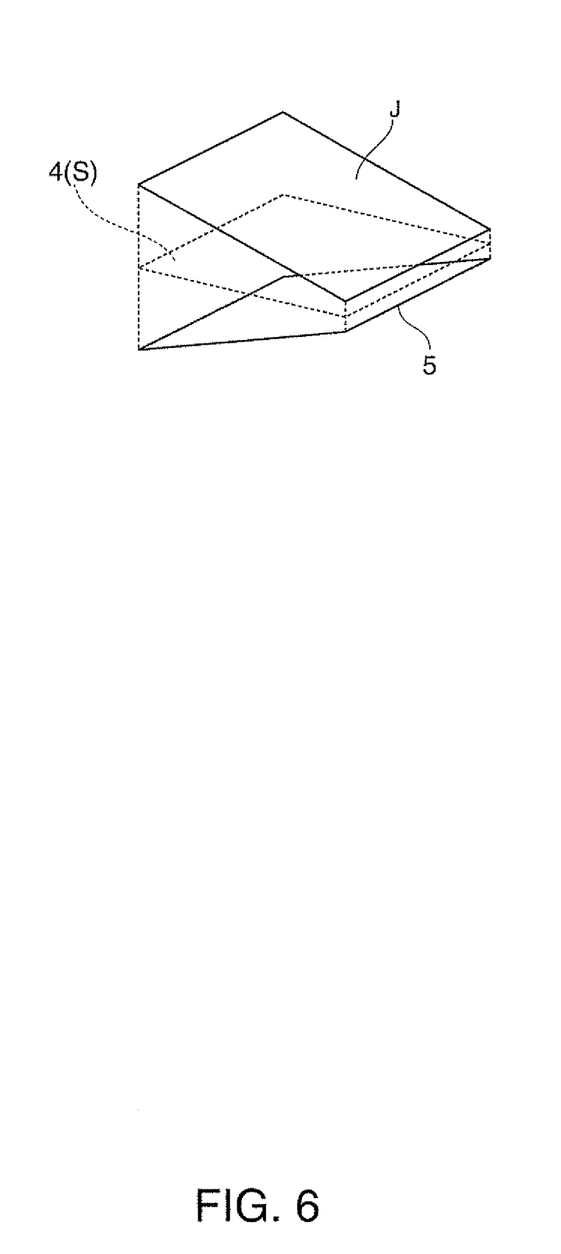
FIG. 6 is a diagram showing the positional relationship between a screen and a real-image forming face.

FIG. 1 is a perspective view showing the display device of this embodiment. FIG. 2 is a side view showing the display device of this embodiment. FIGS. 3A and 3B are diagrams showing a Fresnel lens used in the display device of this embodiment, FIG. 3A being a plan view and FIG. 3B being a sectional view taken on the line B-B' in FIG. 3A. FIGS. 4A and 4B are diagrams showing a retrotransmissive material used in the display device of this embodiment, FIG. 4A being a plan view and FIG. 4B being an enlarged perspective view of a corner portion. FIGS. 5A to 5C are diagrams for explaining the action of the retrotransmissive material. FIG. 6 is a diagram showing the positional relationship between a screen and a real-image forming face.

Incidentally, in all of the following drawings, the ratio of some component elements are sometimes changed to make the drawings more visible.

As shown in FIGS. 1 and 2, a display device 1 of this embodiment has a projector 2 (a projection device), a Fresnel lens 3 (a parallelizing element), a retrotransmissive material 4 (an imaging element), and a screen 5 (a plane onto which an image is projected (hereinafter, an image projected plane)). To the projector 2, an unillustrated video signal generating unit such as a personal computer is connected, and the projector 2 projects images onto the screen 5 based on a video signal input from the video signal generating unit. The projector 2 is placed above in a vertical direction with a projection lens directed downward, and the screen 5 is placed below in a vertical direction with the image projected plane directed upward. On an optical path of a projected light between the projector 2 and the screen 5, the Fresnel lens 3 and the retrotransmissive material 4 are disposed in this order from the side where the projector 2 is located.

As shown in FIGS. 3A and 3B, the Fresnel lens 3 has a plurality of minute prisms 6 which are arranged in a concentric pattern. As shown in FIG. 2, the Fresnel lens 3 has the function of, when a projected light L0 which has been made to exit from the projector 2 at a predetermined angle of diffusion enters the Fresnel lens 3, converting the incident light into a nearly parallelized light L1 and making the light L1 exit therefrom. In this embodiment, as a parallelizing element for converting the projected light L0 into the nearly parallelized light L1, the Fresnel lens 3 is used. However, in place of the Fresnel lens 3, a convex lens may be used.

As shown in FIGS. 4A and 4B, the retrotransmissive material 4 is a rectangular plate material 7 in which a plurality of square pole-shaped openings 8 for allowing the light to pass therethrough are provided. The planar shape of the opening 8 viewed from the direction vertical to an element plane S is square. Incidentally, the "element plane" in this specification is defined as a principal surface (a surface which the light enters or from which the light exits) of the plate material 7 forming the retrotransmissive material 4. Since the plate material 7 has two principal surfaces, it is necessary simply to define one of the two principal surfaces as the element plane. A metal reflecting coating, for example, is formed on two inner wall surfaces among four inner wall surfaces of each opening 8 which two surfaces are orthogonal to each other. These two inner wall surfaces serve as reflection planes 9. These two reflection planes 9 form a so-called dihedral corner reflector.

In the retrotransmissive material 4 of this embodiment, as shown in FIG. 4A, the sides of the square openings 8 are formed so as to be parallel to the sides of the plate material 7 in a plan view, and, in all the openings 8, two inner wall surfaces among the four inner wall surfaces which two surfaces are located on the same side, serve as reflection planes 9.

As shown in FIG. 2, the retrotransmissive material 4 is placed in such a way that the element plane S is vertical to an optical axis L of the projected light L0 from the projector 2. On the other hand, the screen 5 is placed in such a way that the image projected plane is inclined relative to the optical axis L of the projected light L0 from the projector 2. Therefore, the retrotransmissive material 4 and the screen 5 are placed in such a way that the screen 5 is inclined relative to the retrotransmissive material 4 and the element plane S of the retrotransmissive material 4 and the image projected plane of the screen 5 form an acute angle.

As the screen 5, a common reflective screen which is used by being combined with a front projector can be adopted. To obtain a bright spatial image, it is preferable to use a reflective screen which has high reflectivity and can obtain a bright image. The screen 5 of this embodiment is a planar screen.

Here, by using FIGS. 5A to 5C, the action of the retrotransmissive material 4 will be described.

In FIGS. 5A to 5C, the element plane S of the retrotransmissive material 4 is made to coincide with an X-Y plane formed of an X-axis and a Y-axis, and an axis orthogonal to the element plane S is a Z-axis. Moreover, a point from which the light is made to exit is represented by a point P, a point at which the light enters the reflection plane 9 of the retrotransmissive material 4 is represented by a point T, and a point at which the light forms an image is represented by a point Q.

As described earlier, since the two reflection planes 9 of the retrotransmissive material 4 are orthogonal to each other, the light which has entered one reflection plane 9 is reflected off the other reflection plane 9 which is next to the one reflection plane 9 at an angle of 90 degrees. Therefore, when viewed from the direction (the Z-axis direction) orthogonal to the element plane S, as shown in FIG. 5B, as is the case with a common retroreflector, the light which has entered the reflection plane 9 is reflected in the same direction as the direction in which the light has entered the reflection plane 9. That is, when the point P and the point Q are projected onto the X-Y plane, the projective point of the point P and the projective point of the point Q coincide with each other. On the other hand, when viewed from the direction (the direction of the normal of a triangle PTQ formed of the point P, the point T, and the point Q) which is parallel to the element plane S and is orthogonal to a light incidence plane, as shown in FIG. 5C, as is the case with a normal reflecting mirror, the light which has entered the reflection plane 9 is reflected at the angle of reflection a which is the same as the angle of incidence a.

In this way, as shown in FIG. 5A, the light exiting from the point P travels to the point Q via the point T. Unless the screen 5 is a reflection plane that causes mirror reflection or nearly mirror reflection, the light exiting from the point P diffuses within some angular range and enters an area other than the point T of the retrotransmissive material 4. However, since the light that has entered an area other than the point T is also reflected in a similar manner, all of the diffused lights converge to the point Q. That is, another image of an image located on one side of the element plane S is formed in a position in a space on the other side of the element plane S such that the image and the other image are symmetric with respect to the element plane S. Therefore, when there is a three-dimensional object around the point P, a real image is generated as a stereoscopic image around the point Q such that the three-dimensional object and the real image are symmetric with respect to the element plane S of the retrotransmissive material 4.

Moreover, since the retrotransmissive material 4 has the openings 8 that penetrate the retrotransmissive material 4 in the direction vertical to the element plane S, the light that has perpendicularly entered the element plane S of the retrotransmissive material 4 travels in a straight line without entering the reflection plane 9.

In the display device 1 configured as described above, the projected light L0 that has been made to exit from the projector 2 enters the retrotransmissive material 4 vertically from above in a state in which the projected light L0 is nearly parallelized by the Fresnel lens 3. Since the retrotransmissive material 4 has the function of making the light that has almost perpendicularly entered the element plane S travel in a straight line, the light L1 parallelized by the Fresnel lens 3 passes through the retrotransmissive material 4 without change and is then projected onto the screen 5, whereby an image is formed thereon. Incidentally, since the projected light is blocked in an area other than the openings 8 of the retrotransmissive material 4, the smaller the numerical aperture, the darker the image on the screen 5. Therefore, by increasing the numerical aperture by minimizing the spacing between the openings 8 which are next to each other, it is possible to make the image on the screen 5 bright to some extent without major loss of image quality.

At this time, since the screen 5 is a reflective screen, the projected light is reflected off the screen 5 and at the same time is diffused in accordance with the scattering characteristics of the screen 5, and enters the retrotransmissive material 4 again vertically from below in a state in which the angular distribution is widened. As described earlier, the retrotransmissive material 4 has the function of forming an image by the light that has obliquely entered the element plane S such that a position from which the light has obliquely entered the element plane S and a position in which the image is formed are symmetric with respect to the element plane S. Therefore, a real image is generated in a space which is opposite to the side on which the screen 5 is placed with the retrotransmissive material 4 sandwiched between them such that the real image and the image on the image projected plane are symmetric with respect to a plane.

That is, in this embodiment, as shown in FIG. 6, since the screen 5 is placed in an inclined state below the element plane S of the retrotransmissive material 4, a real-image forming face J that is inclined such that the real-image forming face J and the screen 5 are symmetric with respect to a plane is formed in a space above the element plane S of the retrotransmissive material 4, and a real image is formed in a position on the real-image forming face J such that the real image and the image on the screen 5 are symmetric with respect to a plane. In this case, since the screen 5 is a flat surface, the generated real image is the same planar image as the image on the screen 5 and is different from the image on the screen 5 only in inclination.

Therefore, as shown in FIG. 2, when an observer K obliquely looks at the real image from the direction in which the real-image forming face J is inclined, the real image faces the observer K almost directly, whereby the observer K can easily view the real image. Since the generated real image is an image formed by the light reflected by the retrotransmissive material 4, the observer K views the real image as if the real image were floating in space in an observation range KR in which the observer K can view the retrotransmissive material 4.

In an example shown in FIG. 2, the observation range KR is part of the real-image forming face J, and, even when a real image is formed in the entire portion of the real-image forming face J, the observer K cannot view the entire portion of the real-image forming face J. At this time, to make it possible for the observer K to observe the entire portion of the real image, it is necessary simply to make the size of the retrotransmissive material much larger than the size of the screen 5. Alternatively, instead of projecting an image onto the entire portion of the screen 5, it is necessary simply to narrow the image projection range on the screen 5 and project the image onto part of the screen 5. Furthermore, by using black as the background of an image which is an object to be displayed and placing the image near the center of the screen 5, the observer K cannot easily view the background and the shape of the screen and cannot easily grasp the positional relationship between the image and the objects around the image. This makes it possible to give the observer K the sense that the image is floated in space more realistically.

As described above, with the display device 1 of this embodiment, it is possible to realize a display device that can generate an image in space with a simple configuration without the need for a driving unit or the like.

Specifically, by only placing the screen 5 below the retrotransmissive material 4 and projecting an image onto the screen 5 from the projector 2 via the Fresnel lens 3, it is possible to generate a spatial image. Thus, there is no need to place a complicated apparatus or the like below the screen 5. As a result, even when the retrotransmissive material 4 is incorporated into a desk, for example, since there is no cumbersome apparatus or the like under the desk, the observer K can put chairs around the desk and sit the chair in such a way as to place his/her legs under the desk. Therefore, a plurality of observers K are allowed to view a real image in their respective positions close to one another. Moreover, since a configuration in which the projector 2 and the Fresnel lens 3 are placed on the ceiling, for example, can be adopted, when the display device 1 is not used, it is possible to move easily the desk into which the retrotransmissive material 4 is incorporated. In this way, it is possible to provide an easy-to-use display device.

Incidentally, in this embodiment, a configuration in which the retrotransmissive material has rectangular openings has been taken as an example. However, in place of openings, a transmission section that allows the light to pass therethrough may be adopted. That is, a configuration may be adopted in which, on a plate material made of a transparent material, a reflector is placed in a grid-like pattern or so as to have the shape obtained by removing a part of a grid.

Second Embodiment

Hereinafter, a second embodiment of the invention will be described by using FIGS. 7 to 11.

A display device of this embodiment is an example of a display device that can generate a pseudo stereoscopic image in space.

Figure 7:
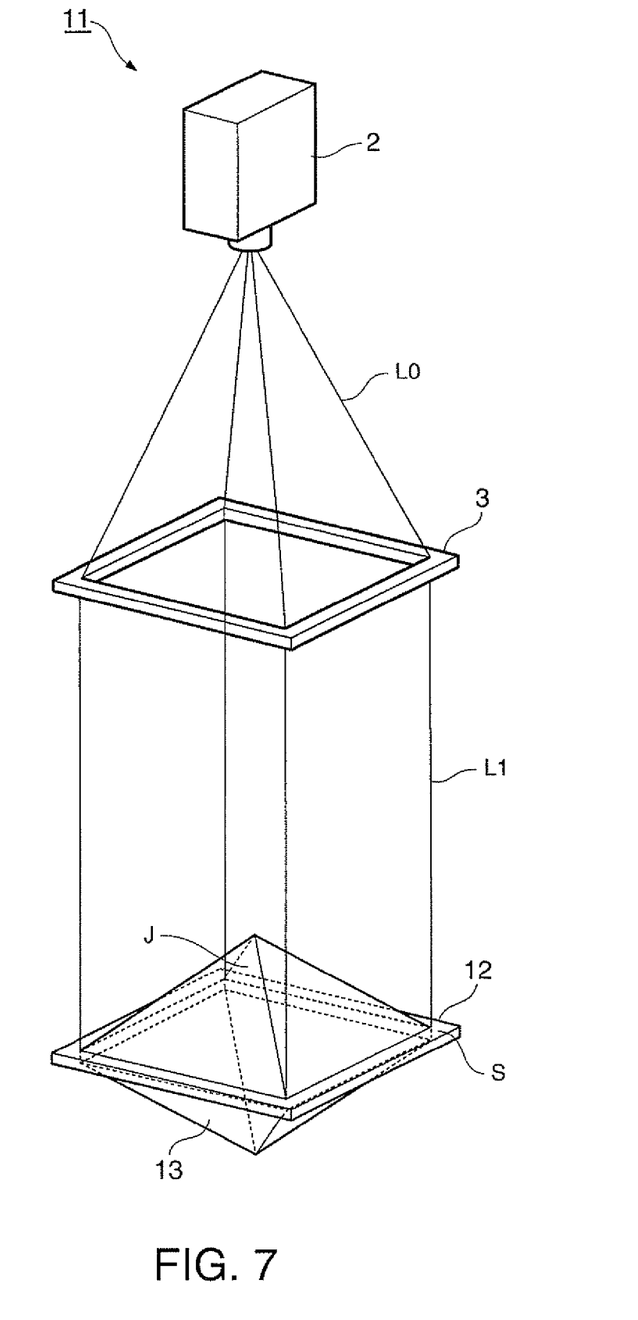
FIG. 7 is a perspective view showing a display device of a second embodiment of the invention.
Figure 8:
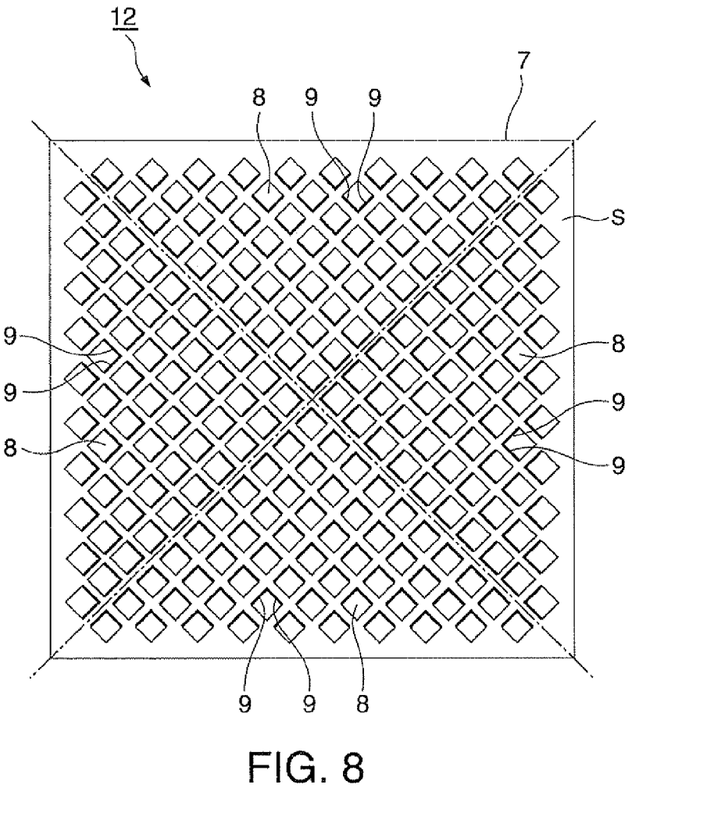
FIG. 8 is a plan view showing a retrotransmissive material used in the display device of this embodiment.
Figure 9:
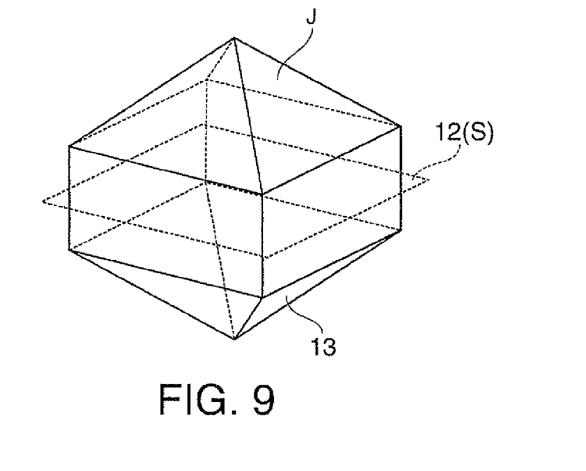
FIG. 9 is a diagram showing the positional relationship between a screen and a real-image forming face.
Figure 10:
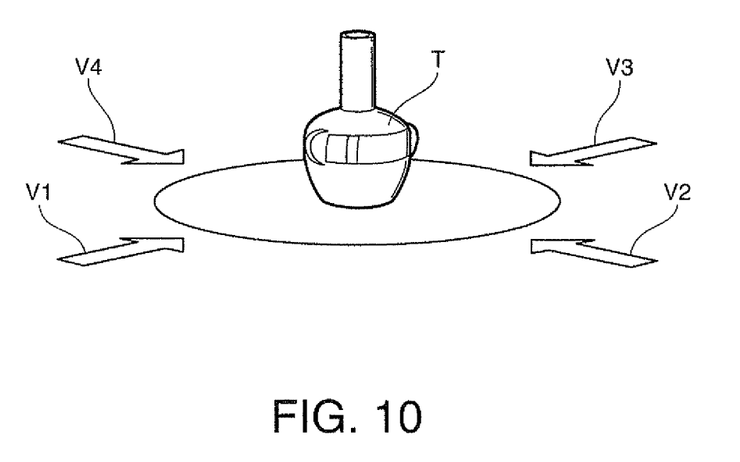
FIG. 10 is a diagram showing an example of an object to be displayed.

FIG. 7 is a perspective view showing the display device of this embodiment. FIG. 8 is a plan view showing a retrotransmissive material used in the display device of this embodiment. FIG. 9 is a diagram showing the positional relationship between a screen and a real-image forming face. Incidentally, in FIG. 7, such component elements as are found also in FIG. 1 of the first embodiment are identified with the same reference characters, and their explanations are omitted.

As shown in FIG. 7, a display device 11 of this embodiment has a projector 2, a Fresnel lens 3, a retrotransmissive material 12, and a screen 13 which are disposed in this order vertically from above. This basic configuration is the same as that of the first embodiment. However, the configurations of the screen 13 and the retrotransmissive material 12 are different from those of the first embodiment. Hereinafter, these configurations will be described.

While the screen 5 of the first embodiment has a planar shape, the screen 13 of this embodiment has, as shown in FIG. 7, has the shape of a quadrangular pyramid protruding vertically downward. In other words, the screen 13 of this embodiment is formed as a concave portion which is recessed in the shape of a quadrangular pyramid as viewed from an element plane S of the retrotransmissive material 12, and has four image projected planes which are inclined relative to the element plane S of the retrotransmissive material 12.

In this embodiment, as shown in FIG. 9, the screen which is recessed downward in the shape of a quadrangular pyramid is placed below the element plane S of the retrotransmissive material 12. This shape is reflected in the shape of a real-image forming face J protruding upward in the shape of a quadrangular pyramid which is formed above the element plane S of the retrotransmissive material 4 such that the real-image forming face J and the screen are symmetric with respect to a plane. On the four faces of the real-image forming face J, real images are formed, the real images and images on the screen 13 being symmetric with respect to a plane.

Figure 11:
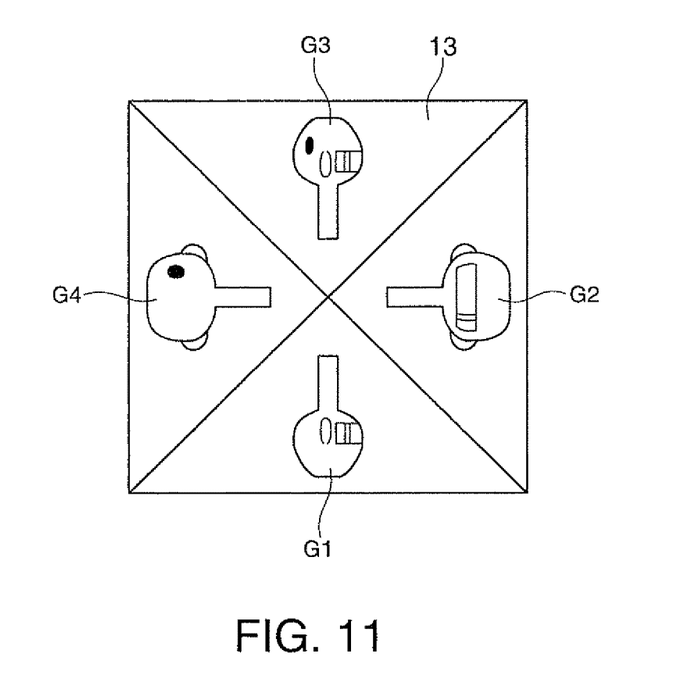
FIG. 11 is a diagram showing an example of a projected image on the screen in the display device of this embodiment.

In FIG. 11, an example of a projected image on the screen 13 is shown. Four images G1 to G4 projected on the four image projected planes of the screen 13 correspond to four images which are obtained by taking images of an object to be displayed T, such as a vase shown in FIG. 10, from four azimuth directions which are different from one another in a horizontal plane, for example, from directions V1 to V4 at azimuth angles of 0, 90, 180, and 270 degrees with respect to a front direction. The above-described four images G1 to G4 on the screen 13 are formed in a space above the retrotransmissive material 12 as four real images such that the four images G1 to G4 and the four real images are symmetric with respect to the element plane S. As a result, when images projected on the screen 13 which are obtained when the screen 13 is viewed from immediately above, are those shown in FIG. 11, real images (spatial images) obtained when the real-image forming face J is viewed from immediately above are also those shown in FIG. 11. Therefore, when the observer K views the real images from the side, not from immediately above, the observer K can view any one of the four images G1 to G4 described above depending on the angle at which the observer K views the image.

In this embodiment, it is preferable that the retrotransmissive material 12 have a configuration shown in FIG. 8.

In the retrotransmissive material 4 of the first embodiment, as shown in FIG. 4A, the sides of the openings 8 are formed so as to be parallel to the sides of the plate material 7, and, in all the openings 8, two reflection planes 9 face in the same direction. On the other hand, in the retrotransmissive material 12 of this embodiment, as shown in FIG. 8, the sides of the openings 8 are formed so as to form an angle of 45 degrees with the sides of the plate material 7. In addition, in each of four regions obtained by diagonally dividing the retrotransmissive material 12, two inner wall surfaces among the four inner wall surfaces of each opening 8, the two inner wall surfaces located at the side closer to the center of the retrotransmissive material 12, serve as reflection planes 9. In other words, in each of the four regions obtained by diagonally dividing the retrotransmissive material 12, two reflection planes 9 face the side (the outside) of the retrotransmissive material 12.

When the retrotransmissive material 12 has the above-described configuration, the lights from the images G1 to G4 projected on the four image projected planes of the screen 13 are reflected by the retrotransmissive material 12 to only the sides on which the images are located. That is, by the retrotransmissive material 12, the light from the image G1 shown in FIG. 11 is reflected only to the lower side of FIG. 11, the light from the image G2 shown in FIG. 11 is reflected only to the right side of FIG. 11, the light from the image G3 shown in FIG. 11 is reflected only to the upper side of FIG. 11, and the light from the image G4 is reflected only to the left side of FIG. 11. By the action described above, only the real image in the direction in which the observer K is located is observed by the observer K. On the other hand, the light from an image located in a direction other than the direction in which the observer K is located is not reflected in the direction in which the observer K is located. Thus, the observer K views only a real image located in front of the observer K and does not view a real image on the back side of the real-image forming face through the real-image forming face.

Also in this embodiment, it is possible to obtain the same effects as those of the first embodiment, such as realizing a display device that can generate an image in space with a simple configuration.

In this embodiment, in particular, since the screen 13 has a three-dimensional shape, the real-image forming face J also has a three-dimensional shape, making it possible to give a three-dimensional appearance to a spatial image formed thereon. Furthermore, in the display device 11 of this embodiment, since different four spatial images can be generated, the observer K can observe spatial images viewed from points of view which are different from one another by 90 degrees when the observer K views the spatial images while moving around the display device 11. Therefore, it is possible to obtain a pseudo stereoscopic image modified by kinematic parallax.

Incidentally, in this embodiment, a case in which the screen 13 has the shape of a quadrangular pyramid has been described. However, the screen 13 may have the shape of a polygonal pyramid, such as a triangular pyramid, other than a quadrangular pyramid. Moreover, a screen having two image projected planes obtained by folding a planar screen once may be used. In these configurations, which inner wall surface of the opening of the retrotransmissive material serves as a reflection plane may be appropriately determined in accordance with the shape of the screen.

In addition, in this embodiment, a configuration in which the retrotransmissive material has rectangular openings has been taken as an example. However, in place of openings, a transmission section that allows the light to pass therethrough may be adopted. That is, a configuration may be adopted in which, on a plate material made of a transparent material, a reflector is placed in a grid-like pattern or so as to have the shape obtained by removing a part of a grid.

Third Embodiment

Hereinafter, a third embodiment of the invention will be described by using FIGS. 12 to 14.

As is the case with the second embodiment, a display device of this embodiment is a display device that can generate a pseudo stereoscopic image in space. However, the configuration of a retrotransmissive material, the shape of a screen, and an image which is projected thereon are different from those of the second embodiment.

Figure 13:
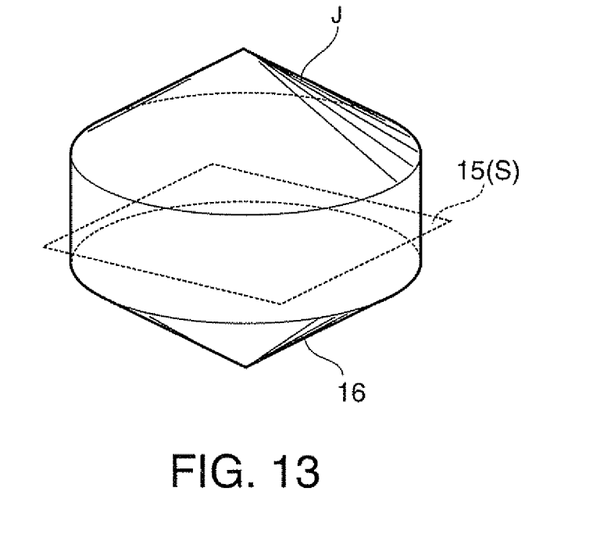
FIG. 13 is a diagram showing the positional relationship between a screen and a real-image forming face.

In this embodiment, as shown in FIG. 13, a screen 16 which is recessed downward in the shape of a cone is placed below an element plane S of a retrotransmissive material 15. That is, the planar shape of the screen 16 is a circle (a curved shape) as viewed from the direction vertical to the element plane S.

This shape is reflected in the shape of a real-image forming face J protruding upward in the shape of a cone which is formed above the element plane S of the retrotransmissive material 15 such that the real-image forming face J and the screen are symmetric with respect to a plane. On the conical real-image forming face J, real images are formed, the real images and images on the screen 16 being symmetric with respect to a plane.

Figure 14:
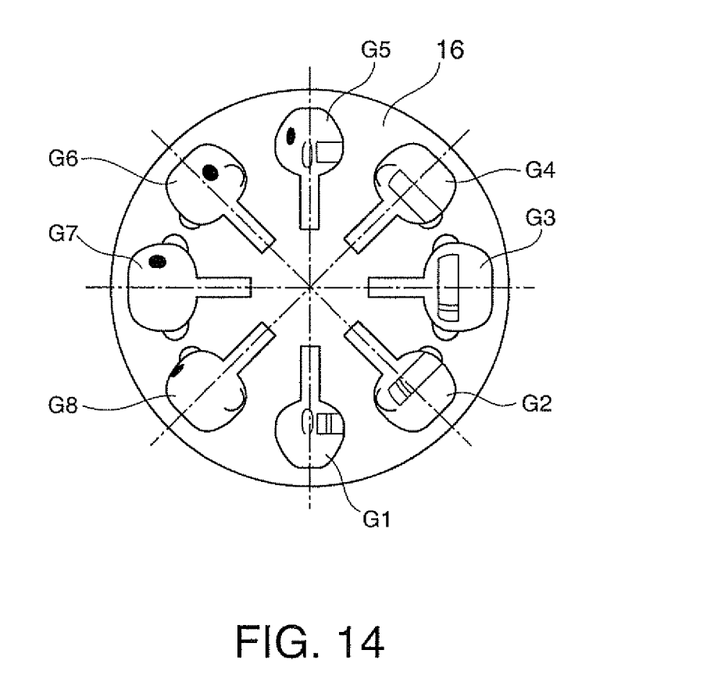
FIG. 14 is a diagram showing an example of a projected image on the screen in the display device of this embodiment.

In FIG. 14, an example of a projected image on the screen 16 is shown. Eight images G1 to G8 projected on the screen 16 correspond to eight images which are obtained by taking images of the same object to be displayed T as that in the second embodiment from eight azimuth directions which are different from one another in a horizontal plane, for example, from directions at intervals of 45 degrees, i.e., at azimuth angles of 0, 45, 90, 135, 180, 225, 270 and 315 degrees with respect to a front direction. The above-described eight images G1 to G8 on the screen 16 are formed in a space above the retrotransmissive material 15 as eight real images such that the eight images G1 to G8 and the eight real images are symmetric with respect to the element plane S. As a result, when the images G1 to G8 projected on the screen 16 which are obtained when the screen 16 is viewed from immediately above, are those shown in FIG. 14, real images (spatial images) obtained when the real-image forming face J is viewed from immediately above are also those shown in FIG. 14. Therefore, when the observer K views the real images from the side, the observer K can view any one of the eight images G1 to G8 described above depending on the angle at which the observer K views the image.

Figure 12:
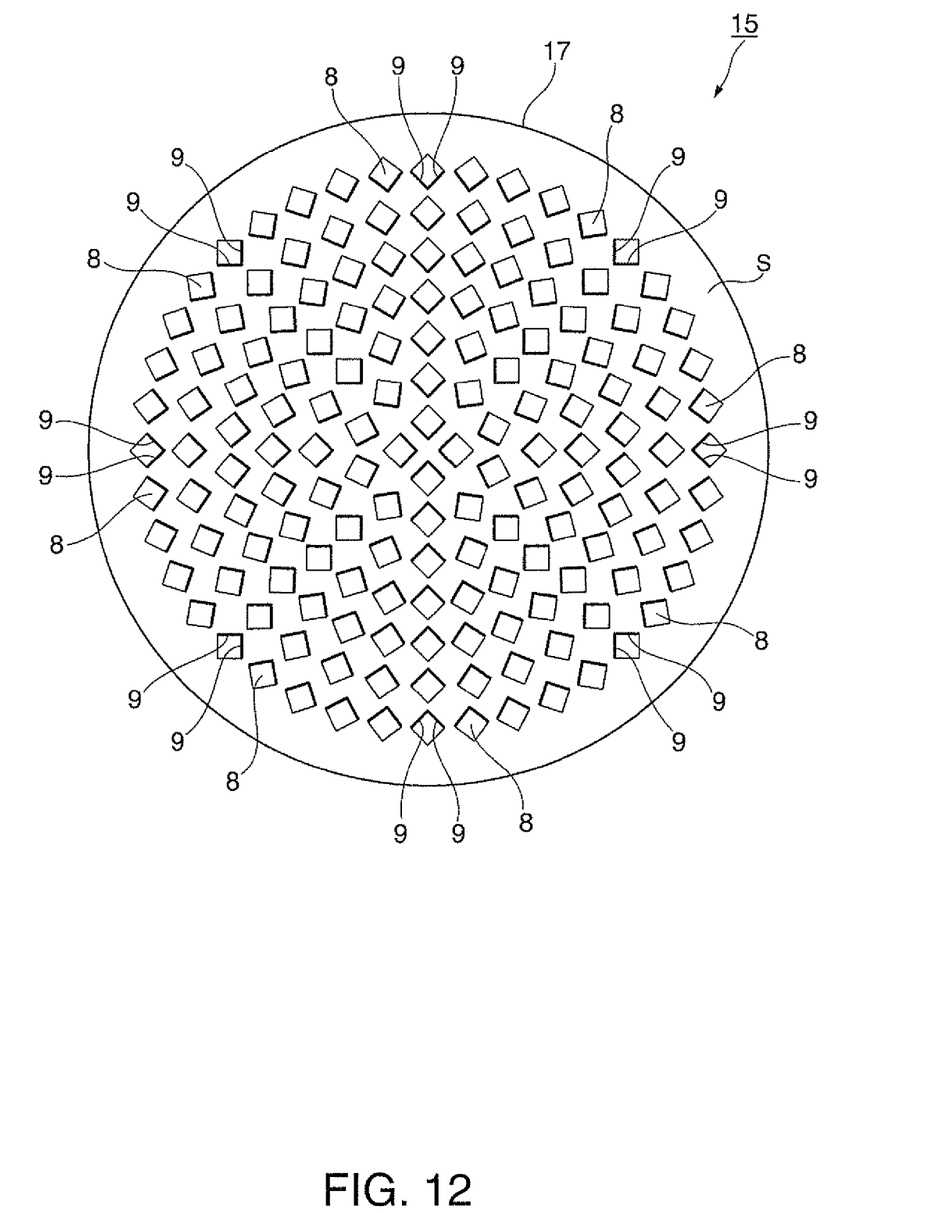
FIG. 12 is a plan view showing a retrotransmissive material used in a display device of a third embodiment of the invention.

In this embodiment, it is preferable that the retrotransmissive material 15 have a configuration shown in FIG. 12. As shown in FIG. 12, the retrotransmissive material 15 of this embodiment is formed as a circular plate material 17 in which a plurality of rectangular openings 8 are formed in a concentric pattern. The openings 8 are arranged in such a way that the diagonal lines thereof coincide with a radial direction of the plate material 17. In addition, two inner wall surfaces among four inner wall surfaces of each opening 8 which two surfaces are located at the side closer to the center of the retrotransmissive material 15, serve as reflection planes 9. In other words, in all the openings 8, two reflection planes 9 face the circumference (the outside) of the retrotransmissive material 15.

By using such a retrotransmissive material 15, also in this embodiment, as is the case with the second embodiment, the lights from the images G1 to G8 projected on the screen 16 are reflected by the retrotransmissive material 15 to only the sides on which the images are located. By the action described above, only the real image in the direction in which the observer K is located is observed by the observer K. On the other hand, the light from an image located in a direction other than the direction in which the observer K is located is not reflected in the direction in which the observer K is located. Thus, the observer K views only a real image located in front of the observer K and does not view a real image on the back side of the real-image forming face through the real-image forming face.

The observation range can be set by the reflection characteristics of the screen 16. For example, to narrow the observation range, the angle distribution of the light reflected off the screen 16 is narrowed; to widen the observation range, the angle distribution of the light reflected off the screen 16 is widened. The observation range is appropriately set in accordance with the contents to be displayed.

Also in this embodiment, it is possible to obtain the same effects as those of the first and second embodiments, such as realizing a display device that can generate an image in space with a simple configuration. Moreover, as is the case with the second embodiment, by providing a real-image forming face with a three-dimensional shape, it is possible to give a three-dimensional appearance to a spatial image.

Incidentally, in this embodiment, as an example of an image which is projected onto the screen 16, as shown in FIG. 14, the discrete images G1 to G8 obtained by dividing the object to be displayed T into eight portions at intervals of 45 degrees have been shown. However, by using continuous images in place of the above images, it is possible to display more continuous spatial images for a position in which the observer views the images.

Furthermore, by making settings so as to make the right and left eyes view different spatial images by narrowing the reflection characteristics of the screen 16, it is possible to display a stereoscopic image using binocular parallax. As described above, since the observer is allowed to observe a spatial image in accordance with a position in which the observer views the image, it is possible to obtain a natural stereoscopic image.

Moreover, a plurality of images which are projected onto the screen 16 can be generated by obtaining continuous images by a method such as taking images of the object to be displayed T while rotating the object to be displayed T or taking images of the object to be displayed T while making an observation point move equidistantly and at the same angle, and performing image conversion on the images thus obtained. Furthermore, the plurality of images which are projected onto the screen 16 can also be obtained by placing a mirror corresponding to the shape of the screen 16 on the same axis as the optical axis of a shooting lens and taking images with the optical axis set in a vertical direction.

In this embodiment, an example in which the screen 16 has a conical shape has been described. However, the screen 16 may have an elliptic conical shape or other pyramidal or conical shapes. Moreover, the cross-sectional shape of the screen at a plane vertical to the image projected plane may be a curve. That is, the screen may have the shape of a hemisphere, for example. The placement of the openings of the retrotransmissive material and the placement of the reflection planes in these configurations are appropriately determined in accordance with the shape of the screen.

Moreover, in the second and third embodiments, examples in which the screen has a shape protruding downward have been described. However, the screen may have a shape protruding upward toward the retrotransmissive material. In such a case, the real-image forming face has a shape protruding downward toward the retrotransmissive material. Furthermore, in place of forming the screen in such a way that the entire screen is recessed upward or downward, a convex portion or a concave portion may be formed in only part of the screen.

It is to be understood that the technical scope of the invention is not limited to the embodiments described above and various changes can be made therein without departing from the spirit of the invention. For example, in the embodiments described above, a retrotransmissive material having a plurality of rectangular openings has been taken as an example of an imaging element. However, the imaging element is not limited to the retrotransmissive material of this type, and other imaging elements may be used as long as they have optical characteristics shown in FIGS. 5A to 5C. For example, the imaging element may be formed as an imaging element into which an afocal lens system is incorporated or an imaging element into which other microoptical systems are incorporated. Moreover, by adopting a configuration in which a screen is made of a material that can expand and contract and a vertex portion thereof can be moved in a vertical direction, it is also possible to make the spatial image expand or contract in a height direction.

The entire disclosure of Japanese Patent Application No. 2011-055184, filed Mar. 14, 2011 is expressly incorporated by reference herein.

What is claimed is:

1. A display device comprising:
   a projection device that makes a projected light exit therefrom;
   a parallelizing element that converts the projected light from the projection device into a nearly parallelized light;
   an image projected plane which the projected light exiting from the projection device enters via the parallelizing element, the image projected plane having light reflectivity on which an image by the projected light is formed; and
   an imaging element provided between the parallelizing element and the image projected plane, the imaging element forming another image of an image located on one side of the element plane in a position in a space on the other side of the element plane such that the image and the other image are symmetric with respect to the element plane,
   wherein
   the imaging element makes a light which has entered the element plane almost perpendicularly from the parallelizing element travel in a straight line and forms an image by a light that has obliquely entered the element plane among diffuse lights from the image projected plane, such that a position from which the light has obliquely entered the element plane and a position in which the image is formed are symmetric with respect to the element plane, and thereby forms a real image of the image on the image projected plane.

2. The display device according to claim 1, wherein the image projected plane is a flat surface.

3. The display device according to claim 2, wherein the image projected plane is placed so as to be inclined relative to the element plane of the imaging element.

4. The display device according to claim 1, wherein the image projected plane has, in at least part thereof, a convex portion protruding toward the element plane of the imaging element or a concave portion which is recessed as viewed from the element plane of the imaging element.

5. The display device according to claim 4, wherein the convex portion or the concave portion has a plurality of flat surfaces which are inclined relative to the element plane of the imaging element.

6. The display device according to claim 4, wherein the convex portion or the concave portion is curved at least in an azimuth direction.

7. The display device according to claim 4, wherein a plurality of images obtained when an object to be displayed is viewed from different directions are projected from the projection device in such a way that the images are arranged in an azimuth direction in the convex portion or the concave portion of the image projected plane.

8. The display device according to claim 1, wherein the imaging element is formed of a retrotransmissive material having a plurality of rectangular transmission sections that allow a light to pass therethrough, and in the retrotransmissive material, among four wall surfaces of each transmission section, at least two wall surfaces which are orthogonal to each other are reflection planes.

9. The display device according to claim 8, wherein the arrangement of the wall surfaces among the four wall surfaces of the transmission section of the imaging element which wall surfaces among the four wall surfaces are reflection planes differs from region to region of the imaging element, and in the imaging element, the reflection planes are disposed in such a way that each of a plurality of images projected on the image projected plane is reflected in an azimuth direction corresponding to a direction in which an object to be displayed is viewed.

* * * * *